United States Patent [19]

Marquardt

[11] Patent Number: 4,924,646
[45] Date of Patent: May 15, 1990

[54] WIRE GUARD

[76] Inventor: Wayne P. Marquardt, 1902 W. 6th St., Mishawaka, Ind. 46544

[21] Appl. No.: 275,786

[22] Filed: Nov. 23, 1988

[51] Int. Cl.$^5$ .............................................. E04B 5/48
[52] U.S. Cl. ...................................... 52/221; 174/48
[58] Field of Search .............................. 52/221; 174/48

[56] References Cited

U.S. PATENT DOCUMENTS

| 2,511,277 | 6/1950 | Lumley | 174/48 X |
| 3,211,824 | 10/1965 | Heiman | 174/48 |
| 3,325,585 | 6/1967 | Brenneman | 174/48 |
| 3,350,501 | 10/1967 | Jureit | 174/48 X |
| 3,689,681 | 9/1972 | Searer et al. | 174/48 |
| 4,332,429 | 6/1982 | Frick et al. | 174/48 X |
| 4,807,417 | 2/1989 | Bell | 174/48 X |

Primary Examiner—David A. Scherbel
Assistant Examiner—Creighton Smith
Attorney, Agent, or Firm—Todd A. Dawson

[57] ABSTRACT

A C-shaped wire guard device for positioning within a notch formed in the face of a stud in a building structure. The wire guard and notch define a protective channel for passage of an electrical wire therebetween. To prevent transverse movement of the guard within the stud, a flange or barb extends from each side of the guard to overly a side of the stud. In one embodiment each flange forms a smooth corner surface for preventing snagging or scrapping of the electrical conductor when the wire is pulled through the channel during wiring of the structure.

5 Claims, 3 Drawing Sheets

![4,924,646]

WIRE GUARD

SUMMARY OF THE INVENTION

This invention is a Continuation-In-Part of U.S. Design patent application No. 729,935 filed May 3, 1985 and relates to an electrical wire guard for use in the building industry.

In the building industry, such as in the construction of manufactured housing, it is common to pre-cut or notch the edge of a support stud to accommodate electrical wiring as it passes between the stud and the overlying wall. A problem arises, however, when the manufacturer in applying wall board over the studding, or the home owner in hanging a picture or the like, drives a nail, staple, or similar attachment device through the wall board and into the stud. It is possible that the attachment device will be driven into the underlying electrical wiring, thereby creating an electrical short which can cause harm to life and property. To prevent this from occurring, the wire guard device as disclosed in the parent design application Serial No. 729,935 was developed. The C-shaped wire guard of the parent application was designed to fit within the stud notch and overlie the wiring to thereby define a protective channel with the stud for the electrical wire. A pair of barb like projections as illustrated in the parent application extend from each end of the guard and straddle the stud to prevent the guard from sliding sideways out of the stud-notch. One problem associated with the wire guard of the parent application is that the sharp corner surface formed by each projection has a tendency to snag or scrape the insulation of the wire as the wire is slid or pulled across the stud during installation of the electrical wiring and fixtures. An obvious problem such as shock or fire may occur when the electrical wire has had a portion of its insulation removed. A second embodiment of the wire guard of this invention eliminates the problem described above by providing the guard with smooth stud-engaging retaining members to prevent damage to the wire or the possiblity of its snagging.

Accordingly, it is an object of this invention to provide for a novel electrical wire guard.

Another object of this invention is to provide for an electrical wire guard which in combination with a stud protects a transversing electrical wire from damage.

Other objects of this invention will become apparent upon a reading of the following description.

DESCRIPTION OF THE PREFERRED EMBODIMENT

Figure 1:
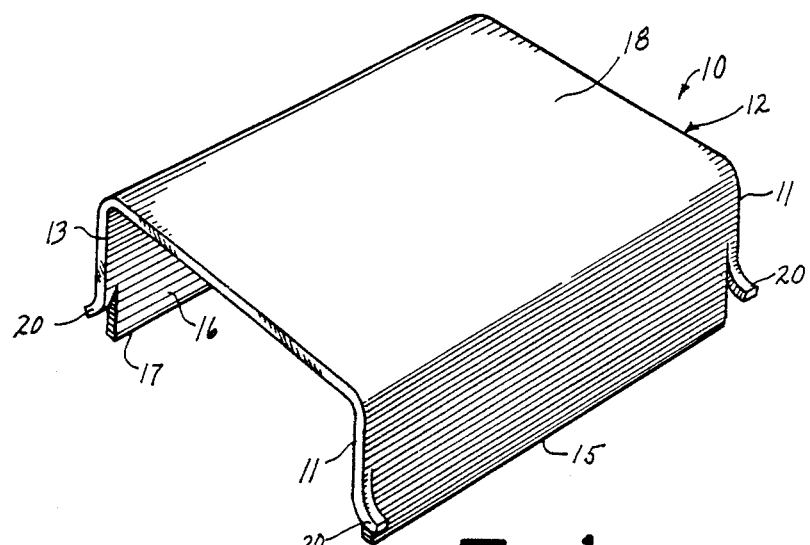
FIG. 1 is a perspective view of the wire guard invention.
Figure 2:
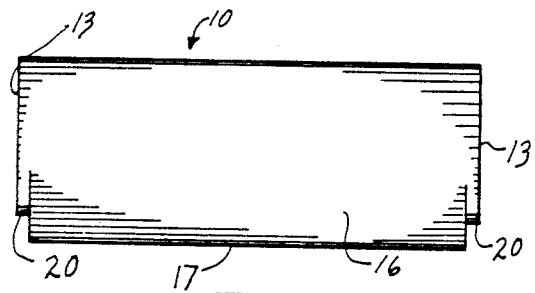
FIG. 2 is a top view of the wire guard device.
Figure 3:
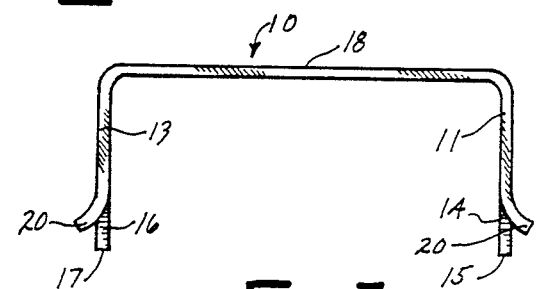
FIG. 3 is an end view of the wire guard device.
Figure 4:
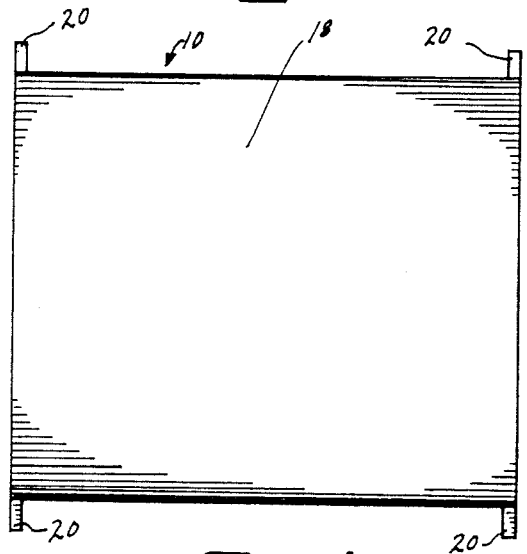
FIG. 4 is an outer side view of the wire guard device.
Figure 5:
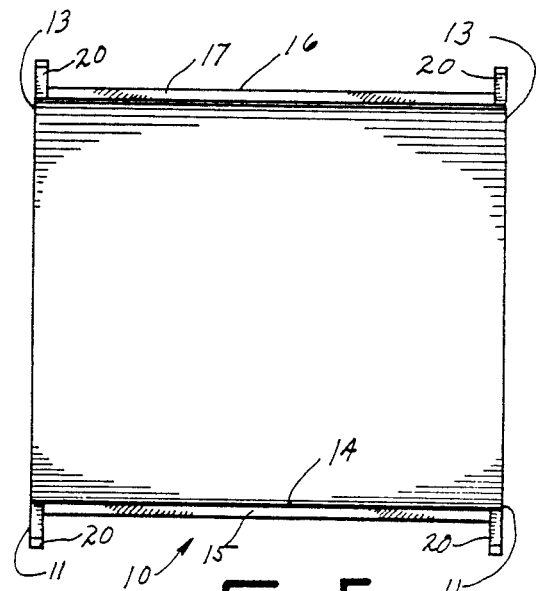
FIG. 5 is an inner side view of the wire guard device.

The preferred embodiments herein disclosed are not intended to be exhaustive or to limit the invention to the precise forms disclosed. Rather, they are chosen and described to enable others skilled in the art to utilize its teachings.

Referring now to the drawings, FIGS. 1-5 illustrate the first embodiment of guard member 10. Guard 10 includes an elongated generally C-shaped body member 12 having legs 14, 16 and an interconnecting web 18. Leg 14 includes sides 11 and an end 15. Leg 16 includes sides 13 and end 17. To retain guard 10 within a notch formed in a stud, a projection member or barb 20 extends outwardly at an oblique angle from each leg 14, 16. Projection members 20 are formed by first slitting the side 11, 13 of legs 14, 16 beginning at their ends 15, 17 and then bending the slit section of each leg 14, 16 outwardly. The distance between the projection members 20 of each leg 14, 16 is slightly greater than the notch width in the receiving stud so as to transversely anchor the guard in the notch with the web 18 of the guard lying generally flush with the outer edge of the stud.

Figure 7:
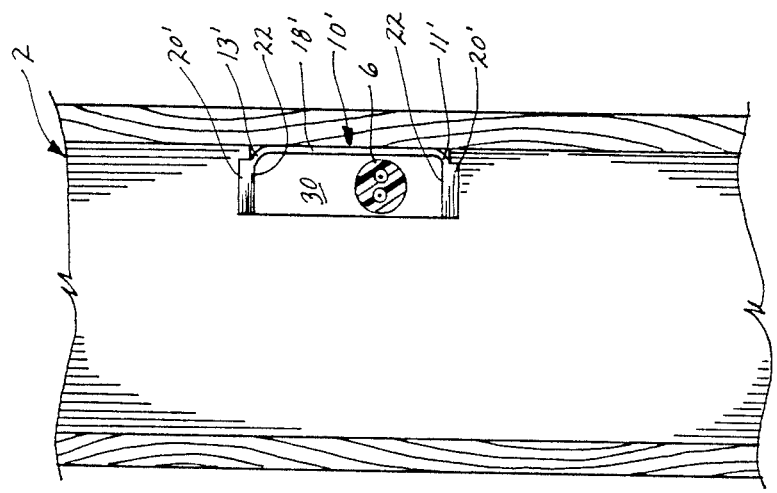
FIG. 7 is an end view in partial section as seen from line 7—7 of FIG. 8.
Figure 6:
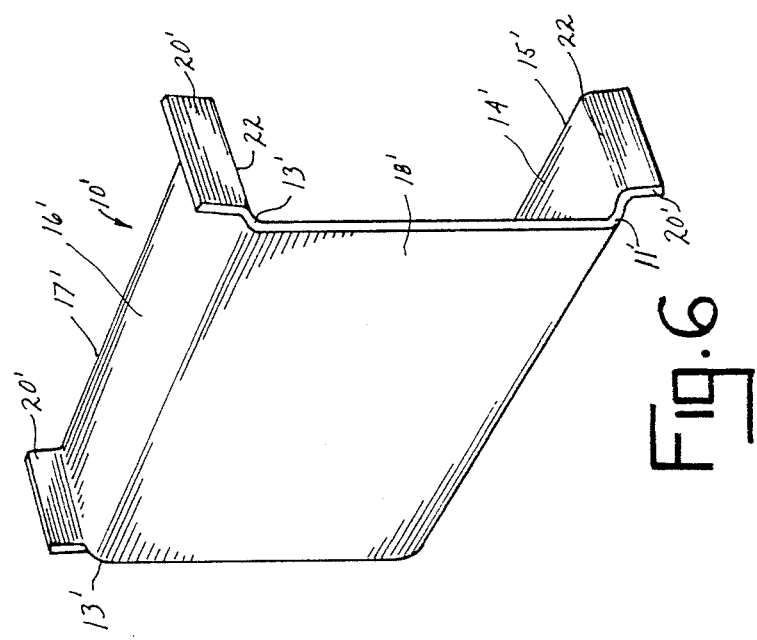
FIG. 6 is a perspective view of the second embodiment of the invention.
Figure 8:
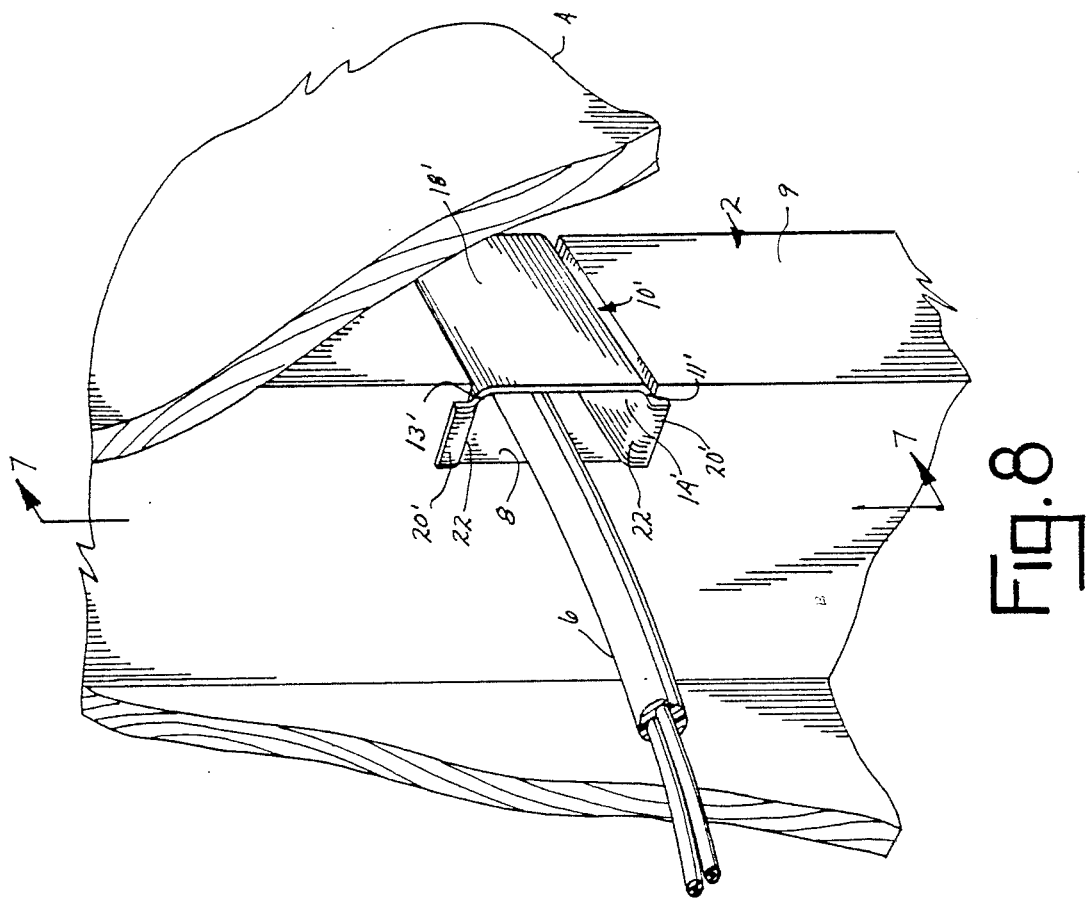
FIG. 8 is a perspective view of the second embodiment of the wire guard device shown in its environment with portions cut away for illustrative purposes.

A second embodiment of the invention is illustrate is in FIGS. 6-8. In this embodiment, guard 10' is provided with flange-like projection member 20' which are outturned and extend approximately ⅛ to ¼ inch beyond the connecting leg 14', 16'. To form projection members 20', extension parts are provided at sides 11' and 13' of legs 14', 16' and are bent outwardly at right angles relative to the legs. Each projection member 20' is connected by a smooth corner 22 to its corresponding leg. This smooth corner 22 protects electrical wire 6 from scrapping or snagging when the wire pulled through the guard such as during wiring of the building structure.

FIGS. 7-8 illustrates a representative wall construction of a building structure which includes a plurality of studs 2 (only one shown) to which an interior wall board 4 is attached. To accommodate an electrical wire 6 a square edged notch 8 is cut into the outer edge 9 of the stud 2. The wire guard 10' of this invention is positioned within notch 8 as illustrated to define in conjunction with the stud a protective channel 30 for wire 6. The distance between the projection member 20' of each leg 14' is slightly greater than the width of notch 8 across stud 2 to transversly anchor guard 10' in the notch. It should be understood that a wall board 4 will overlie the outer edge 9 of stud 2 and web 18' of guard 10' to prevent the guard from shifting forward and out of the stud 2.

Both guards 10 and 10' may be formed from sheet metal or of any other durable fastener impregnable material.

It should be futher understood that the invention is not to be limited to the above-description but may be modified within the scope of the appended claims.

I claim:

1. A wire guard device comprising a generally C-shaped body having an interior formed by two generally parallel legs and an interconnecting web, each of said legs having first and second sides and terminating in an end spaceably located from the web, a projection member extending outwardly from each of said first and second sides of each leg away from the interior of said body and constituting means for overlying an edge of a stud to restrict transverse movement of said device relative to said stud.

2. In combination a wire guard and stud member providing a channel therebetween for passage of an insulated electrical conductor through said channel, said stud having an outer edge and a notch formed therein at said edge, said guard comprising a generally C-shaped body including a pair of substantially parallel legs and a web interconnecting said legs, each of said legs having first and second sides and terminating in an end spacedly located from the web, a projection member extends from each of said legs first and second sides, said wire guard being positioned within said notch with each leg end located innermost within said notch and said web nearest the plane of said stud edge, said projecting members overlying opposite edges of said stud at said notch and constituting means for preventing transverse movement of said wire guard relative to said stud out of the notch.

3. The combination of claim 2 wherein each projection member is of flange-like-form connected by a bend to a said leg at its said side.

4. The combination of claim 3 wherein each bend extends substantially the length of its connecting leg between said leg end and said web.

5. The combination of claim 3 wherein each projection member extends at substantially a right angle to its connecting leg.

* * * * *